United States Patent
Sato et al.

(10) Patent No.: US 9,158,866 B2
(45) Date of Patent: Oct. 13, 2015

(54) LAYOUT-DESIGN SUPPORT SYSTEM AND LAYOUT-DESIGN SUPPORT PROGRAM

(75) Inventors: Masatake Sato, Tokai (JP); Ichiro Harashima, Hitachiota (JP); Yuichi Koizumi, Hitachinaka (JP); Koji Shiroyama, Mito (JP)

(73) Assignee: Hitachi, Ltd., Tokyo (JP)

( * ) Notice: Subject to any disclaimer, the term of this patent is extended or adjusted under 35 U.S.C. 154(b) by 1511 days.

(21) Appl. No.: 12/823,812

(22) Filed: Jun. 25, 2010

(65) Prior Publication Data

US 2010/0333038 A1 Dec. 30, 2010

(30) Foreign Application Priority Data

Jun. 26, 2009 (JP) ................. 2009-151718

(51) Int. Cl.
*G06F 3/048* (2013.01)
*G06F 13/00* (2006.01)
*G06F 17/50* (2006.01)

(52) U.S. Cl.
CPC ............ *G06F 17/50* (2013.01); *G06F 2217/34* (2013.01)

(58) Field of Classification Search
CPC .. G06F 2217/34; G06F 2217/06; G06T 19/20
USPC ............ 345/419, 467, 468; 715/849
See application file for complete search history.

(56) References Cited

U.S. PATENT DOCUMENTS

| | | | | |
|---|---|---|---|---|
| 5,412,756 A | * | 5/1995 | Bauman et al. ................. | 706/45 |
| 5,517,428 A | * | 5/1996 | Williams .......................... | 703/1 |
| 5,740,341 A | * | 4/1998 | Oota et al. ..................... | 345/420 |
| 5,821,934 A | * | 10/1998 | Kodosky et al. ............... | 715/763 |
| 6,012,036 A | * | 1/2000 | O'Brien, Jr. ...................... | 705/5 |
| 7,676,348 B2 | * | 3/2010 | Okada ............................... | 703/2 |
| 8,175,419 B2 | * | 5/2012 | Satoh ............................ | 382/305 |
| 2003/0020715 A1 | * | 1/2003 | Sakakura et al. ............. | 345/424 |

(Continued)

FOREIGN PATENT DOCUMENTS

| | | | |
|---|---|---|---|
| JP | 64-28785 | * | 1/1989 |
| JP | 64-28785 A | | 1/1989 |
| JP | 10-11490 A | | 1/1998 |

OTHER PUBLICATIONS

JP 64-28785 English Translation pp. 1-10.*

(Continued)

*Primary Examiner* — Kyle Stork
*Assistant Examiner* — Mario M Velez-Lopez
(74) *Attorney, Agent, or Firm* — Crowell & Moring LLP

(57) ABSTRACT

A logical designing part includes a logical connectivity data storage that stores logical connectivity data, indicating a logical connectivity between plant equipments, including first end point connection data. A geometry data designing part includes a geometry data storage that stores geometry data that is graphical shape data in a three-dimensional space and includes second end point data. A data linking part includes: an automatic correspondence table generating part that compares first end point connection data with second end point data and generates a logical connection and geometry data table including correspondence data that links the geometry connection data and the geometry data of which first and second end point connection data are matched each other. A correspondence storage stores the logical connection and geometry data table. An editing part edits the logical connection and geometry data table on the basis of a user command.

14 Claims, 15 Drawing Sheets

(56) References Cited

U.S. PATENT DOCUMENTS

| | | | |
|---|---|---|---|
| 2006/0279572 A1* | 12/2006 | Okada et al. | 345/467 |
| 2006/0282235 A1* | 12/2006 | Thomas et al. | 703/1 |
| 2007/0165021 A1* | 7/2007 | Hanke | 345/419 |
| 2007/0266365 A1* | 11/2007 | Kawamoto | 716/21 |
| 2007/0288207 A1* | 12/2007 | Backe et al. | 703/1 |
| 2008/0120070 A1* | 5/2008 | Miller et al. | 703/1 |
| 2008/0140357 A1* | 6/2008 | Bussey et al. | 703/1 |
| 2008/0189083 A1* | 8/2008 | Schell | 703/1 |
| 2008/0255818 A1* | 10/2008 | Jefferson et al. | 703/13 |
| 2010/0325594 A1* | 12/2010 | Sakata et al. | 716/106 |
| 2011/0209081 A1* | 8/2011 | Chen et al. | 715/771 |
| 2011/0238387 A1* | 9/2011 | Miyake et al. | 703/1 |

OTHER PUBLICATIONS

Japanese Office Action dated Nov. 15, 2011, (two (2) pages).

* cited by examiner

| LOGICAL CONNECTIVITY DATA ID | PHYSICAL PATH DATA ID |
|---|---|
| L-001 | Line3 |
| L-002 | Line6 |
| L-003 | Line1 |

| LOGICAL CONNECTIVITY DATA ID | PHYSICAL PATH DATA CANDIDATE ID GROUP |
|---|---|
| Line1 | L-001,L-003,L-117 |
| Line2 | L-006 |
| Line3 | |

LAYOUT-DESIGN SUPPORT SYSTEM AND LAYOUT-DESIGN SUPPORT PROGRAM

CROSS REFERENCE TO RELATED APPLICATIONS

This application claims the foreign priority benefit under Title 35, United States Code, §119(a)-(d) of Japanese Patent Application No. 2009-151718, filed on Jun. 26, 2009 in the Japan Patent Office, the disclosure of which is herein incorporated by reference in its entirety.

BACKGROUND OF THE INVENTION

1. Field of the Invention

The present invention relates to a layout-design support system for supporting a layout design of, for example, equipments, pipes, and cable trays and a layout-design support program on a computer readable medium.

2. Description of the Related Art

Recently in designing a plant, a layout of pipe components such as a straight pipe, an elbow, a valve, a reducer, and a tee is considered on a 3D-CAD (Three-Dimensional Computer Aided Drawing) as a technology of the 3D-CAD has been developed. In addition, as digitized layout design information has been widely used, there is a technology in which design information on drawings prepared on an upstream side of the design process is handled on a 3D-CAD as input data. For example, JP 10-11490 discloses that a two-dimensional connection drawing indicating a logical connection relation among equipments and pipe components is prepared by a 2D-CAD and the CAD data is used for 3D-pipe-modeling with a 3D-CAD system.

SUMMARY OF THE INVENTION

A first aspect of the present invention provides a layout-design support system comprising:
  a logical designing part including a logical connectivity data storage that stores logical connectivity data indicating a logical connectivity between a plurality of plant equipments and including first end point connection data;
  a geometry data designing part including a geometry data storage that stores geometry data that is graphical shape data in a three-dimensional space and includes second end point data; and
  a data linking part comprising:
    an automatic correspondence table generating part that compares first end point connection data included in the logical connectivity data with second end point data included in the geometry data correspondence and automatically generates a logical connection and logical data table including correspondence data that links the geometry connection data to the geometry data of which first and second end point connection data are matched each other;
    a correspondence table storage that stores the logical connection and geometry data correspondence table; and
    an editing part that edit the logical connection and geometry data correspondence table on the basis of a user command inputted with an input device.

A second aspect of the present invention provides a layout-design support system comprising:
  a logical designing part including a logical connectivity data storage that stores logical connectivity data indicating a logical connectivity between pipe component groups and equipment groups and including logical end point connection data;
  a geometry data designing part comprising:
    a physical path data storage that stores physical path data that is pipe path data that is pipe path data in a three-dimensional space and includes path end point data;
    a pipe components model data storage that stores pipe components model data that is geometry data of the pipe components in the three-dimensional space; and
    a pipe component model generating part that generates the pipe components model data; and
  a data linking part comprising:
    an interactive processing part that performs an interactive processing with a user;
    a logical connectivity data specifying part that detects the logical connectivity data specified by the user from the logical connectivity data storage on the basis of a user command inputted into the interactive processing part;
    a physical path data searching part that searches the physical path data storage for the physical path data including the path end point data that matches the logical end point data included in the logical connectivity data detected by the logical connectivity data specifying part and generates a logical connection and physical path data correspondence table including correspondence data that links the logical connectivity data with the physical path data of which logical end point data and path end data match each other;
    a logical connection and physical path correspondence table storage that stores a logical connection and physical cal correspondence table generated by the physical path data searching part;
    a pipe attribute data generating part that generates pipe attribute data using the logical connection and physical path correspondence table; and
    a pipe attribute data storage that stores pipe attribute data generated by the pipe attribute data generating part and sends the stored pipe attribute data to the pipe component model generating part.

According to the configuration, at the same time as or prior to preparation of the logical connectivity data by the logical designing part, only the pipe path data in the three-dimensional space of the pipes can be generated by the geometry data designing part. Automatic lining the generated physical path data of the pipes to the logical connectivity data after process can be provided to generate a three-dimensional molding data.

A third aspect of the present invention provides a layout-design support program on a computer readable medium for causing a computer to perform designated task corresponding to the first aspect of the present invention.

A forth aspect of the present invention provides a layout-design support program on a computer readable medium for causing a computer to perform designated task corresponding to the second aspect of the present invention.

BRIEF DESCRIPTION OF THE DRAWINGS

The object and features of the present invention will become more readily apparent from the following detailed description taken in conjunction with the accompanying drawings in which:

FIG. 8 is an illustration of an example of "candidate ID list according to the embodiment of the present invention;

The same or corresponding elements or parts are designated with like references throughout the drawings.

DETAILED DESCRIPTION OF THE INVENTION

Prior to describing embodiments of the present invention, the above-mentioned related art will be further explained.

The related art mentioned above assumes that in 3D-pipe modeling on the 3D-CAD, lay out design is performed for each pipe component unit. Accordingly, the 2D connection drawing such as a pipe system drawing should be determined to such an extent that a specification of each part in the pipe system drawing is precisely determined.

On the other hand, there may be a case where designing of pipe path in 3D space is required within a short period for estimation on business. Accordingly, there may be a case where only pipe path design out of processes of the 3D-molding is previously done on a 3D-CAD. After completion of the pipe system drawing pipe, components with attributes are arranged on a path.

However, the related art assuming that completion of the 2D connection drawing such as the pipe system drawing, cannot provide data link between pipe path data (on the 3D-CAD side) and the pipe system data in the case where the pipe path design has been previously done on the 3D-CAD.

The present invention provides data link between the pipe path data (3D-CAD side) and the pipe system data when only the pipe path design has been previously done on the 3D-CAD out of out of processes of the 3D-molding. The pipe path design and the pipe system design can be performed at the same time in parallel to finish the pipe design shortly.

The present invention provides a system for providing a three-dimensional model by automatically linking the physical path data to logical connectivity data.

Accordingly, the pipe path design process in 3D-space can be done prior or at the same time as the pipe system design process. In addition, because the pipe system data and the pipe path data that have been prepared in design process can be automatically linked to each other, the pipe designing can be completed in a short period.

With reference to FIGS. 1 to 16 will be described embodiments of layout-design support system according to the present invention.

Figure 1:
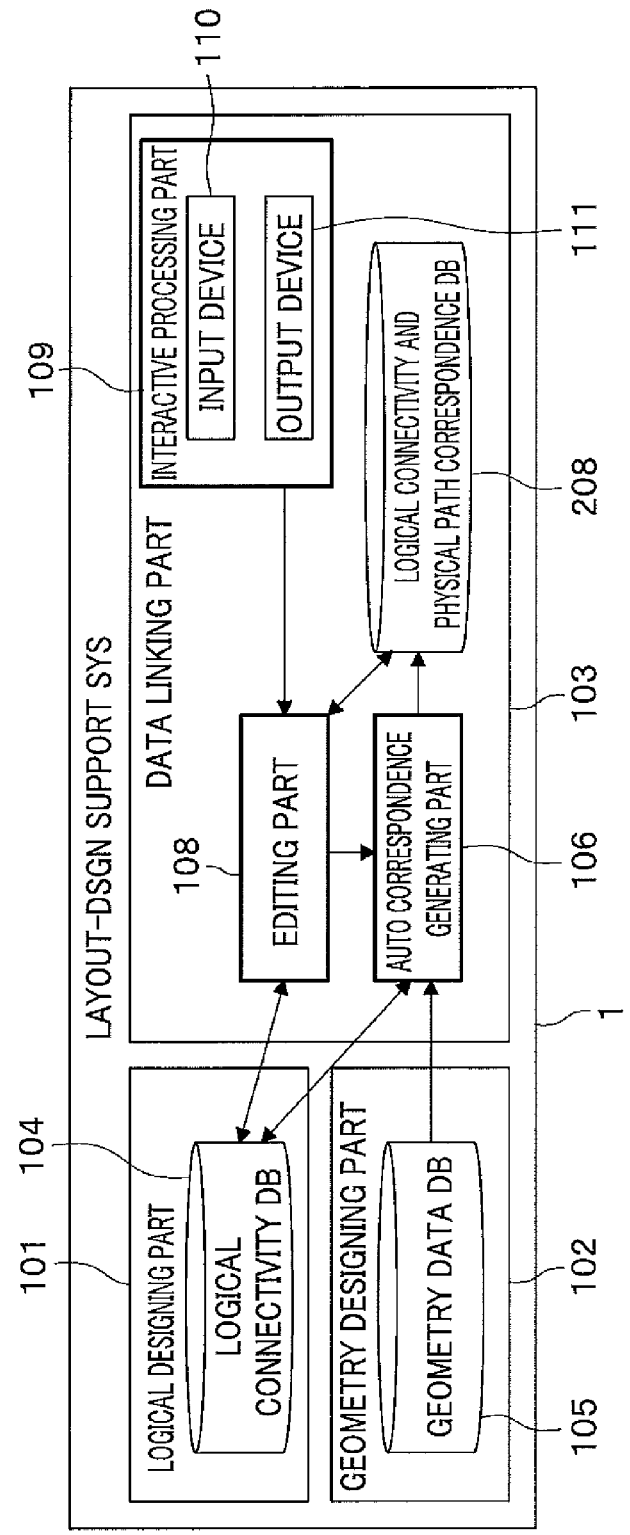
FIG. 1 is a general block diagram of a layout-design support system for explaining a concept of the present invention.

FIG. 1 is a block diagram showing a general configuration of the layout-design support system for explaining a concept of the present invention. As shown in FIG. 1, a layout-design support system 1 includes a logical designing part 101, a geometry data designing part 102, and a data linking part 103 that are configured in a computer 1701.

The logical designing part 101 generates logical connectivity data indicating logical relations among equipment groups (equipments) and pipe groups (pipe components), electric circuits, and the like and outputs the logical connectivity data. More specifically, the logical designing part 101 corresponds to a system design CAD system.

The logical designing part 101 is provided by that the computer 1701 conducts a program, for example, on a computer-readable medium 1703. The logical connectivity data generated by the logical designing part 101 is stored in a logical connectivity database (storage) 104 built on a storage 1702 included in the computer 1701.

The geometry data designing part 102 generates data regarding geometries of equipments, pipe components or the like in a three-dimensional space and designs arrangement of the equipments and pipe components in the three-dimensional space. More specifically, the geometry data designing part 102 corresponds to a 3D-CAD system. The geometry data designing part 102 is provided by that the computer 1701 conducts a program similarly to the logical designing part 101. The geometry data generated by the geometry data designing part 102 is stored in a geometry data database 105 built in the storage of the computer 1701. The "geometry data" is data regarding, for example, physical wiring path.

The data linking part 103 is a part that links the logical connectivity data generated by the logical designing part 101 to the geometry data generated by the geometry data designing part 102. In the embodiment, the data linking part 103 includes an automatic correspondence generating part 106, a logical connectivity and physical path correspondence database 208, an editing part 108, and an interactive processing part 109. The data linking part 103 is provided by that the computer 1701 conducts the program.

The automatic correspondence generating part 106 automatically detects a correspondence relation between the logical connectivity data and the geometry data and generates data indicating the correspondence relation. The automatic correspondence generating part 106 obtains the logical connectivity data regarding connection destination and connection status of a wiring path terminal from the logical connectivity database 104 and the geometry data regarding the wiring path from the geometry data database 105, compares the obtained data to automatically generate the logical connection and geometry correspondence table indicating the correspondence relation between both the data.

The logical connectivity and physical path correspondence database 208 is built in the storage of the computer 1701 and is a part that obtains and stores the logical connection and geometry correspondence data generated by the automatic correspondence generating part 106.

The storage is, for example, various types of memories and auxiliary storing devices in the computer 1701.

The editing part 108 displays a user operating screen image on an output device 111 of the interactive processing part 109 as well as receives an editing command inputted by a user through an input device 110, and reads out the logical connection and geometry correspondence table stored in the logical connectivity and physical path correspondence database 208 on the basis of the received editing command to edit the logical connection and geometry correspondence table. In addition the editing part 108 stores the edited logical connection and geometry correspondence table in the logical connectivity and physical path correspondence database 208.

The interactive processing part 109 includes the input device 110 and the output device 111. The input device 110 is, for example, a mouse 1704 and a keyboard 1705 that input the user command in response to the operation of the user into the computer 1701. The output device is, for example, a display unit that display or outputs data for the user.

The layout-design support system according to an embodiment will be described more specifically.

Figure 2:
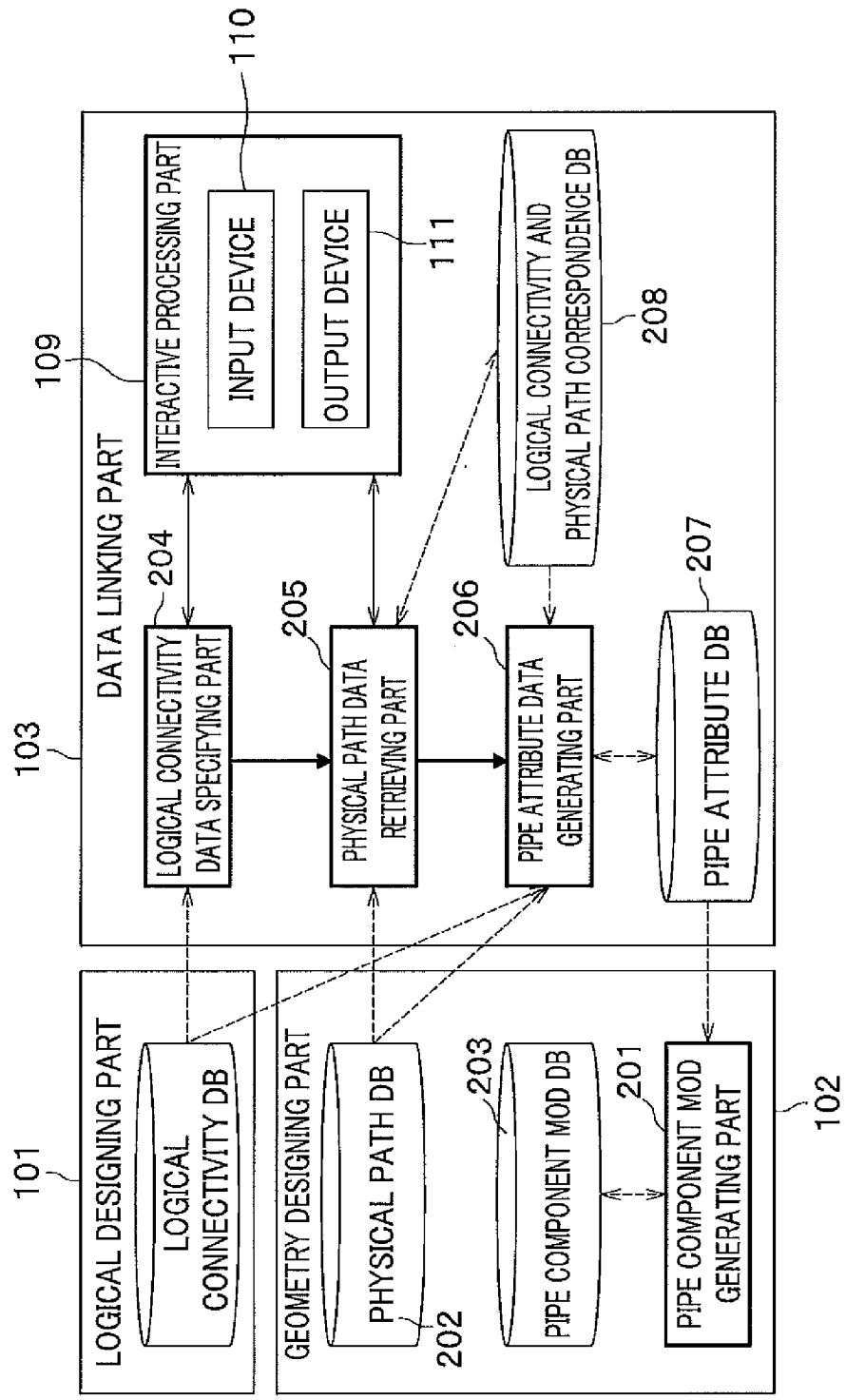
FIG. 2 is a block diagram more specifically showing the layout-design support system according to an embodiment of the present invention.

FIG. 2 is a block diagram showing configuration of the layout-design support system according to the embodiment. The same elements in FIG. 1 are designated with the same references.

The geometry data designing part 102 includes a pipe component model generating part 201, a physical path database 202 for the geometry data database 105, and a pipe component model database 203. The pipe component model generating part 201 generates pipe component model data on the basis of pipe attribute data generated by the data linking part 103 (mentioned later). The physical path database 202 stores the physical path data. The pipe component model database 203 stores the pipe component model data.

The data linking part 103 includes a logical connectivity data specifying part 204 which is a part of the editing part 108, a physical path data retrieving part (physical path data searching part) 205 for the automatic correspondence generating part 106, a pipe attribute data generating part 206, a pipe attribute database 207, and a logical connection and physical path correspondence database 208.

The logical connectivity data specifying part 204 displays a user operating screen image on the output device 111 of the interactive processing part 109 and retrieves the logical connectivity data specified by the logical connectivity database 104 on the basis of the editing command inputted by the user with the input device 110.

The physical path data retrieving part 205 retrieves the physical path data linked to the logical connectivity data detected by the logical connectivity data specifying part 204 and generates the logical connection and physical path correspondence table indicating a correspondence relation between the logical connectivity data and the physical path data.

The logical connection and physical path correspondence database 208 corresponds to a logical connectivity and physical path correspondence database 208 and stores the logical connection and geometry correspondence table generated by the physical path data retrieving part 205.

The pipe attribute data generating part 206 generates the pipe attribute data from the logical connectivity data and the physical path data with the logical connection and physical path correspondence table.

Next, will be described each data in the embodiment.

Figure 3:
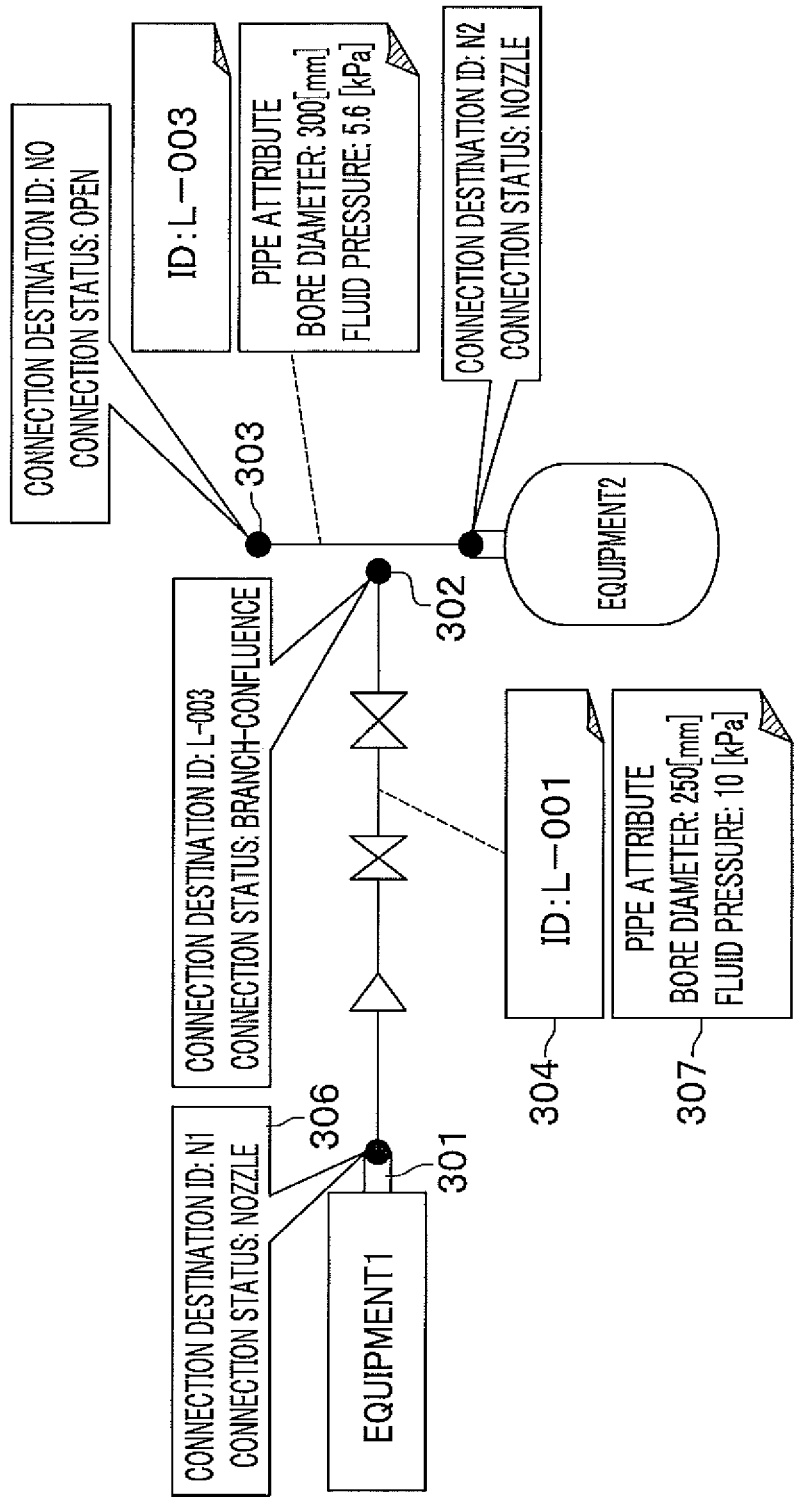
FIG. 3 is an illustration of an example of "logical connectivity data" according to the embodiment of the present invention.

FIG. 3 shows an example of the logical connectivity data in the embodiment. The logical connectivity data is data indicating a logical connectivity of the pipe components connected to the equipments (not shown) and connected between the equipments in a plant (not shown). More specifically, for a series pipe component group having a section of which end points are previously determined as an equipment nozzle connection point 301, a branch-confluence point 302, an open end 303, and the like, connection status data is provided to each one section connecting both ends thereof, the connection status data including a logical connectivity data ID 304 indicating a section, a connection destination ID 305 indicating a destination of the both end points of the section, a connection status of the end point (nozzle connection, branch-confluence, an open end, or the like).

The logical connectivity data may have attribute data 307 including a pipe attribute such as a bore diameter and a fluid pressure, an inherent attribute of each pipe component, and an order of series of connected pipe components. For the logical connectivity data ID, for example, an internal ID issued by a system design CAD which is a logical designing part, or a pipe system number assigned by the user is used.

Figures 4, 5:
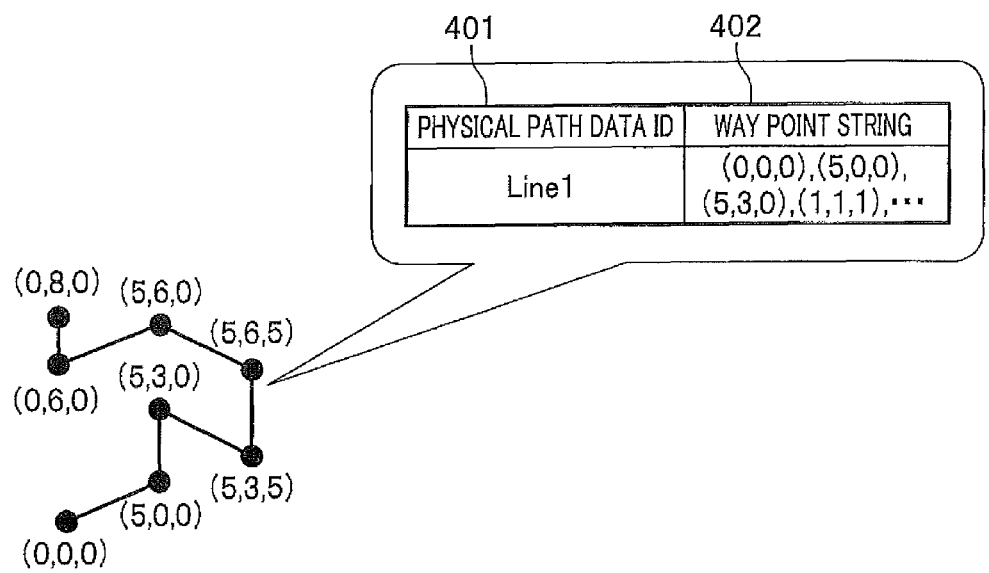
FIG. 4 is an illustration of an example of "physical path data" according to the embodiment of the present invention.
FIG. 5 is an illustration of an example of "logical connection and physical path linking table data" according to the embodiment of the present invention.

FIG. 4 shows an example of "physical path data" in the embodiment. The physical path data represents zigzag line segments retained in a three-dimensional space to indicate center line data of the pipe path. In the embodiment, as minimum required data, the physical path data ID 401 which is an ID assigned to each record of physical path data and a way point string 402 are held as data, wherein the way point is a three-dimensional coordinate at which a turning point on the path. For the physical path data ID, an internal ID is used which is assigned to each graphic element by a 3D-CAD which is the geometry data designing part 102.

The "pipe attribute data" holds data necessary for generating and arranging a pipe component, i.e., data of position and orientation (direction) of a pipe component in the three-dimensional space in addition to the pipe attribute data 307 held in the logical connectivity data.

The "pipe component model data" is a three-dimensional geometry data of a pipe component generated on the 3D-CAD and includes pipe attribute data and geometric shape corresponding to the pipe attribute data.

FIG. 5 shows an example of a logical connection and physical path correspondence table 208 in the embodiment. The logical connection and physical path correspondence table 208 holds a correspondence data between a logical connectivity data ID assigned to each record of the logical connectivity data and the physical path data ID assigned to each record of the physical path data. More specifically, in FIG. 5, a physical path linkage table 501 indicates correspondence between a pipe section designated with "L-001 of logical connectivity data ID and "Line3" of the physical path data ID.

Next, will be described a method of data processing in the layout supporting apparatus 1 according to the embodiment.

Figure 6:
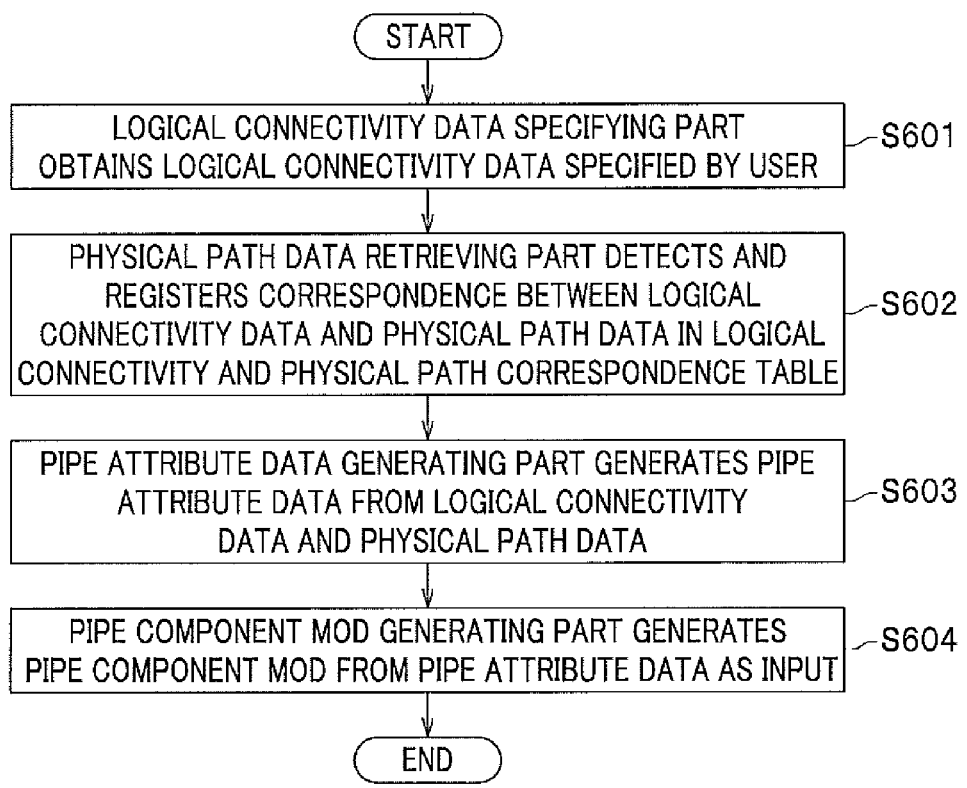
FIG. 6 is a flowchart generally showing data process for 3D pipe modeling according to the embodiment of the present invention.

FIG. 6 is a general flowchart of a data processing method for linking the logical connectivity data to the physical path data by the layout-design support system 1 according to the embodiment.

First, the logical connectivity data and the physical path data previously prepared with the logical designing part 101 and the geometry data designing part 102, are stored in the logical connectivity database 104 and the physical path database 202, respectively.

Next, the logical connectivity data specifying part 204 displays the user operation screen image on the display device as the output device 111 of the interactive processing part 109. When a selection command for logical connectivity data specified by the user is inputted in accordance with a logical connectivity data specifying window displayed on the user operation screen image, this data process is started.

On the basis of the user's selection command for the inputted logical connectivity data, the logical connectivity data specifying part 204 retrieves the logical connectivity data specified by the logical connectivity database 104 (S601).

The physical path data retrieving part 205 searches the physical path database 202 for corresponding physical path data with reference to the logical connectivity data obtained by the logical connectivity data specifying part 204 and stores the result in the logical connectivity and physical path correspondence database 208 (S602).

The pipe attribute data generating part 206 reads the logical connection and physical path correspondence table 208 stored in the logical connectivity and physical path correspondence database 208 as a logical connectivity and physical path correspondence table. The pipe attribute data generating part 206 retrieves, on the basis of the read logical connection and physical path correspondence table, the logical connectivity data and the physical path data having a correspondence relation from the logical connectivity database 104 and the physical path database 202, respectively. The pipe attribute data generating part 206 generates pipe attribute data from the obtained logical connectivity data and physical path data to store the generated pipe attribute data into the pipe attribute database 207 (S603).

The pipe component model generating part 201 in the geometry data designing part 102 retrieves (obtains) the pipe attribute data stored in the pipe attribute database 207 and generate the pipe component model data from the obtained pipe attribute data to store the generated pipe component model data in the pipe component model database 203 to finish the series of the process (S604).

A configuration of the physical path data retrieving part 205 and the data processing method will be described more specifically.

Figure 7:
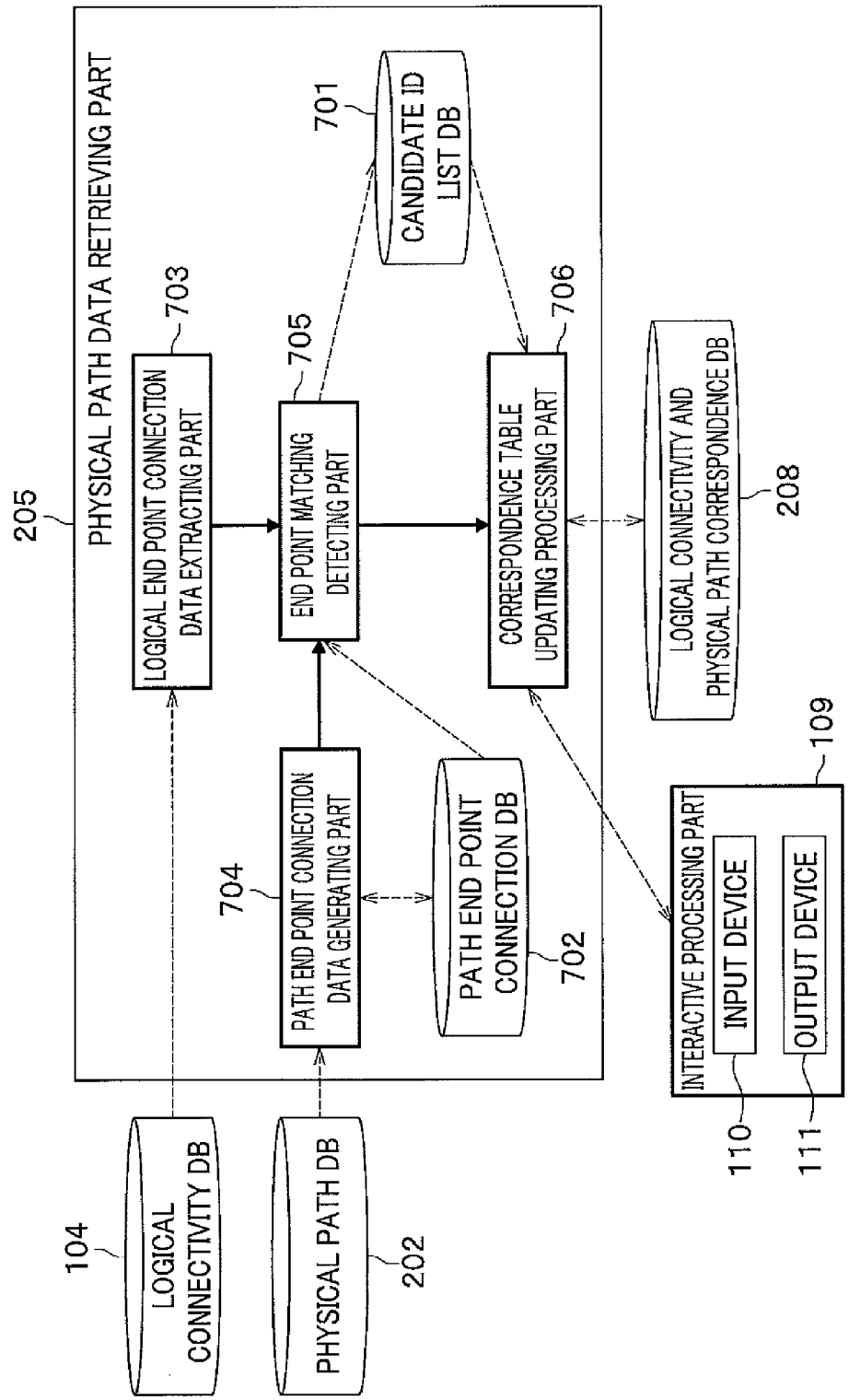
FIG. 7 is a block diagram of a physical path data searching part.

FIG. 7 is a block diagram of the physical path data retrieving part 205. The physical path data retrieving part 205 includes a candidate ID list database 701 for storing a candidate ID list in which physical path data IDs which are correspondence candidates gathered, a path end point connection database 702 for storing path end point data, a logical end point connection data extracting part 703, a path end point connection data generating part 704, an end point matching detecting part 705, and a correspondence table updating processing part 706.

The logical end point connection data extracting part 703 obtains from the logical connectivity database 104 a connection destination ID of the logical connectivity data detected by the logical connectivity data specifying part 204.

The path end point connection data generating part 704 estimates end point connection data by determination in interference between a passage path line segment and both end points (each end point) of a line segment on the basis of way point string of each record of the physical path data stored in the physical path database 202 to store the estimated end point connection data as path end point connection data in the path end point connection database 702.

The end point matching detecting part 705 compares the connection destination ID extracted by the logical end point connection data extracting part 703 with the end point data estimated by the path end point connection data generating part 704 to register an ID list of the identical physical path data as the candidate ID list in the candidate ID list database 701.

FIG. 8 shows an example of the candidate ID list 801 according to the embodiment. The candidate ID list 801 holds a logical connectivity data ID 802 and all records of physical path data ID 803 which are corresponding candidates of the logical connectivity data.

Figure 9:
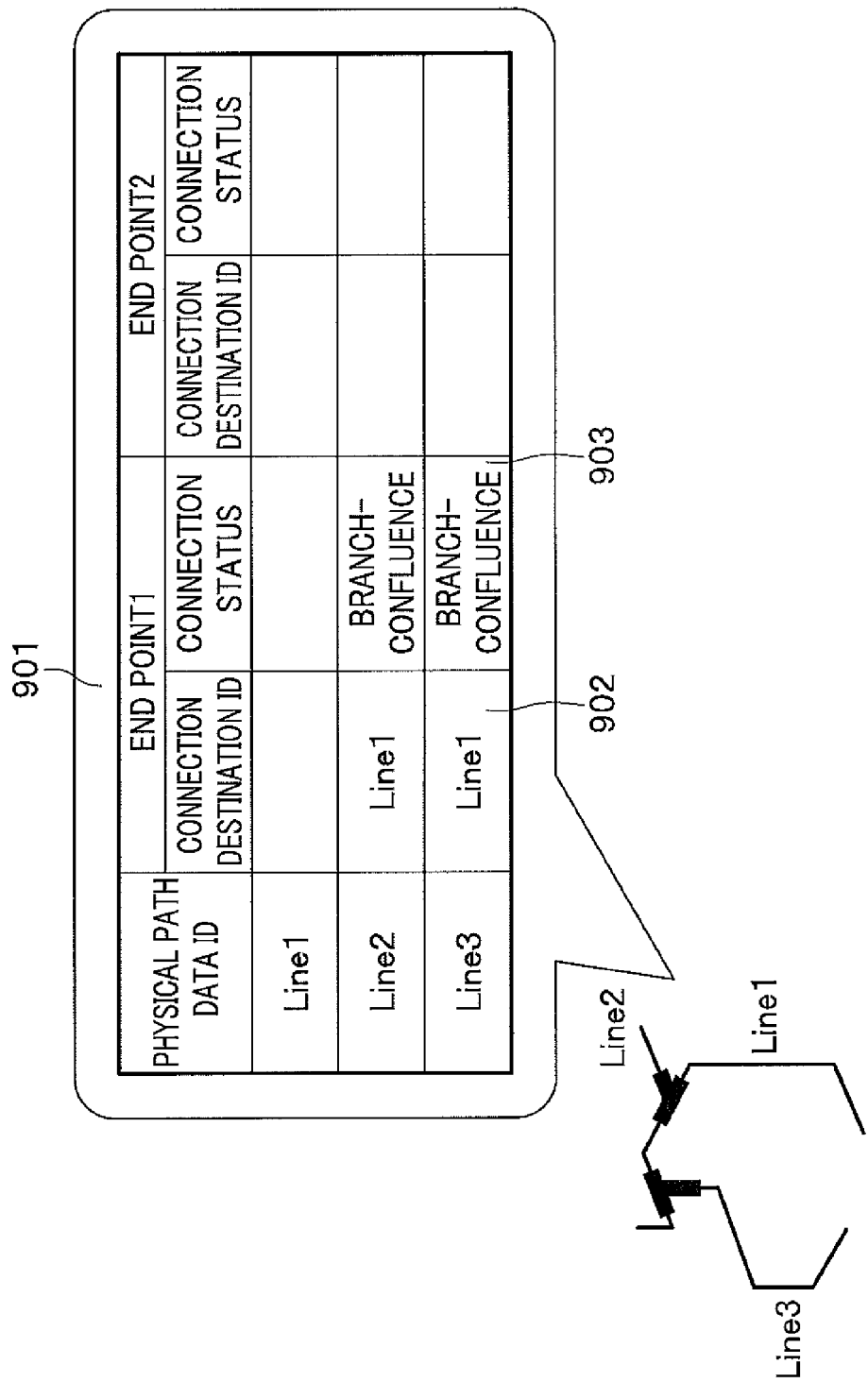
FIG. 9 is an illustration of an example of path end point connection data according to the embodiment of the present invention.

FIG. 9 shows an example of path end point connection data 901 in the embodiment. The path end point connection data 901 holds a connection destination ID 902 and connection status data 903 of both end points of the physical path data. The connection destination ID 902 is an ID of the physical path data of a connection destination for the physical path data end point. The connection status data 903 holds data regarding how the line segment of the physical path data is connected to the line segment of the connection destination physical path data (branch-confluence, an open end, connected ends) and is end point connection data estimated by the path end point connection data generating part.

Figure 10:
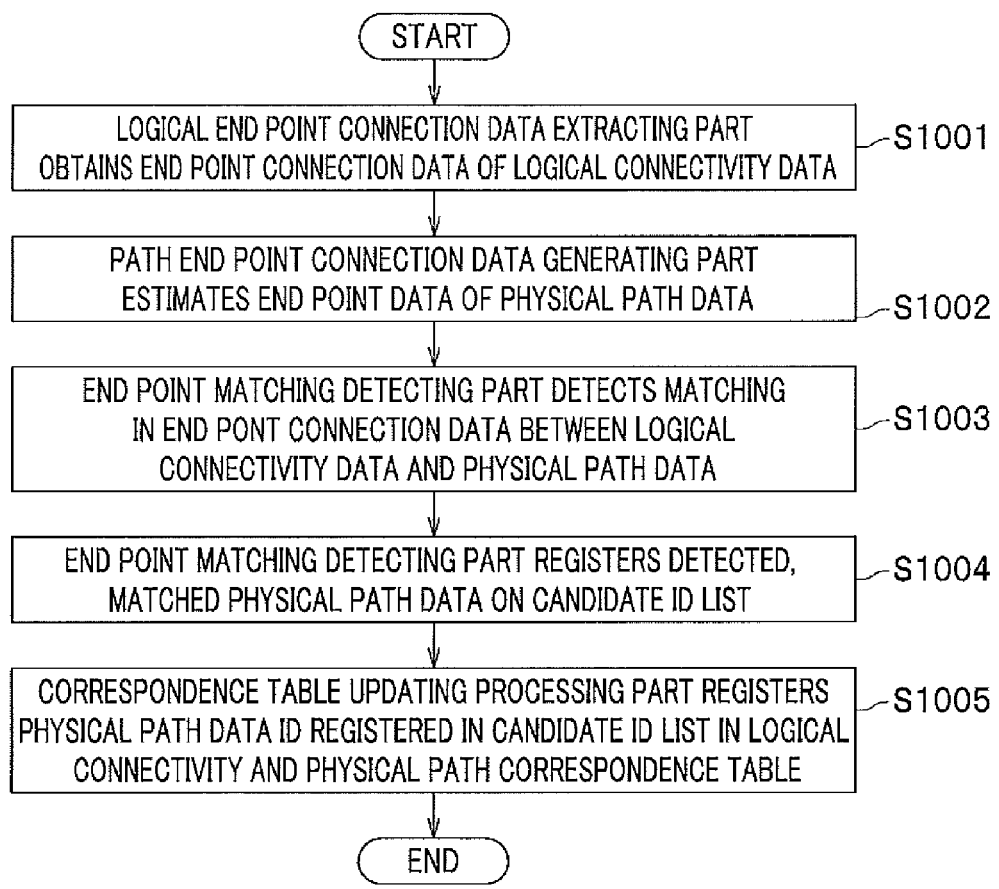
FIG. 10 is a flowchart showing a process in the physical path data searching part shown in FIG. 7.

FIG. 10 shows a flowchart of the data processing method in the physical path data retrieving part 205 shown in FIG. 7.

The logical end point connection data extracting part 703 obtains the logical connectivity data ID from the logical connectivity data specifying part 204 and obtains the connection destination ID and a connection status which correspond to the obtained logical connectivity data ID (S1001).

The path end point connection data generating part 704 estimates the end point data from the way point string in the physical path data and stores the estimated end point data in the path end point connection database 702 as path end connection data (S1002).

The steps 1003 and 1004 show processing by the end point matching detecting part 705. The end point matching detecting part 705 compares the connection destination ID and connection status of the logical connectivity data with the connection destination ID and connection status of the estimated path end point connection data to detect identity therebetween to find a physical path data ID holding path end connection data which is identical with the connection destination ID-connection status of the logical connectivity data (S1003).

Next, the end point matching detecting part 705 registers the detected physical path data ID on a candidate ID list as candidate data corresponding to the logical connectivity data (S1004).

A correspondence table updating processing part 706 causes the output device 111 to display a logical connection and physical path correspondence correction window to output the candidate ID list (S1005).

When the user selects a record of the physical path data ID as a registering object for the candidate ID list as necessary, the selection command is sent to the correspondence table updating processing part 706 through the input device 110 (through S1005).

In the presence of the selection command, the selected candidate ID list is registered in the logical connection and physical path correspondence table 203 as a new candidate ID list.

In the absence of the selection command, the correspondence table update processing part 706 registers the physical path data ID registered in the original candidate ID list in the logical connection and physical path correspondence table 208.

Figure 11:
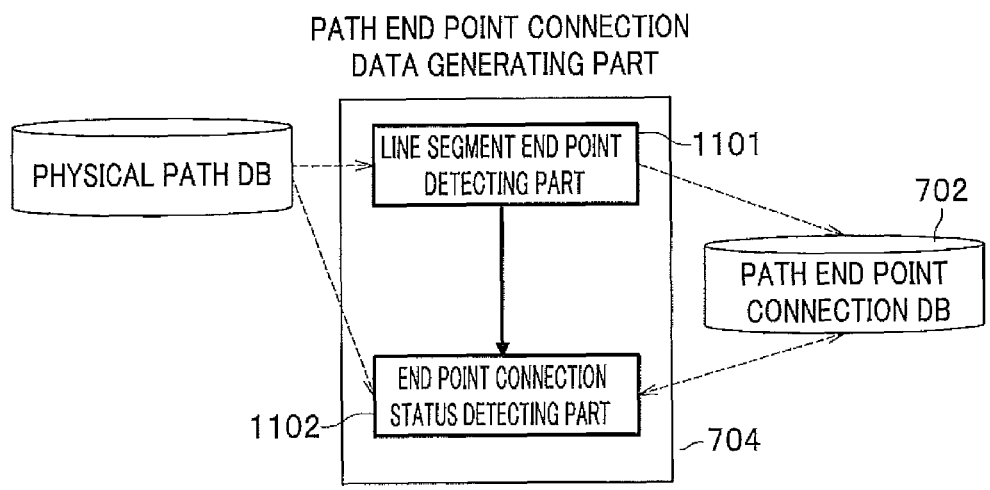
FIG. 11 is a block diagram of a path end point connection data generating part according to an embodiment of the present invention.

FIG. 11 shows an example of the path end point connection data generator 704. The path end point data generating part 704 includes a line segment end point detecting part 1101 and an end point connection status detecting part 1102.

The line segment end point detecting part 1101 detects an end point connection destination for each record of the physical path data. More specifically, the line segment end point detecting part 1101 obtains the physical path data stored in the physical path database 202 and checks a Euclidean distance between coordinates at an end point (both end points) of the obtained physical path data and a line segment of other physical path data stored in the physical path database to detect other physical path data of which line segment is connected to both end points (each end point) of the physical path data. The line segment end point detecting part 1101 registers the physical path data ID of the detected other physical path data in the path end point connection database 702 as a connection destination ID of the physical path data.

On the other hand, the end point connection status detecting part 1102 detects connection geometry between the line segment of the physical path data and the line segment of the physical path data connected to the one end point (both end points). More specifically, the end point connection status detecting part 1102 obtains connection destination IDs of both end points (each end point) of the physical path data and the physical path data corresponding to the obtained connection IDs (hereinafter referred to as connection destination path data) from the physical path database 202. Next, the end point connection status detecting part 1102 detects the nearest point on the connection destination path data (line segment including end points) where a Euclidean distance to the physical path data end points therefrom is shortest and determines whether a connection status of the end points of the physical path data is either of branch-confluence or a butt joint and registers the result as connection status data in the path end point connection database 702.

Figure 12:
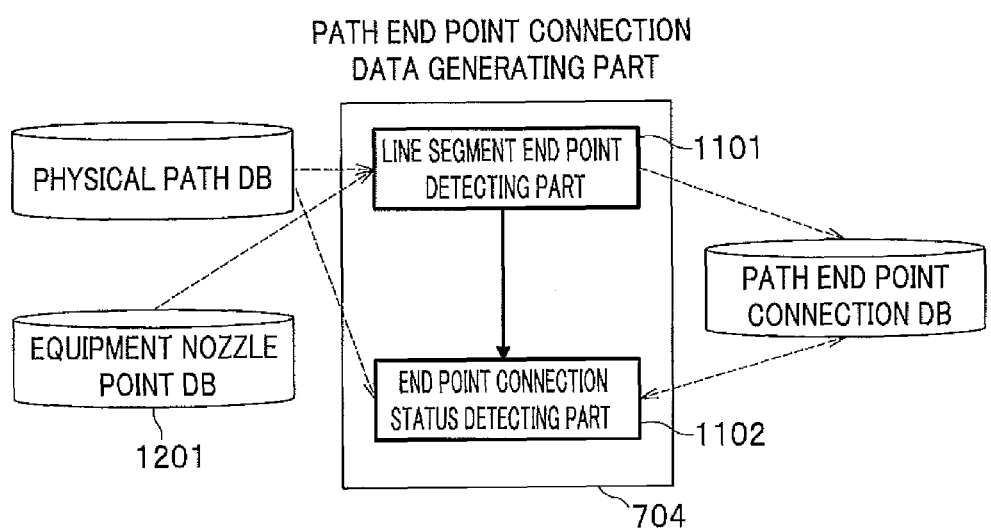
FIG. 12 is a block diagram of a path end point connection data generating part according to another embodiment of the present invention.

FIG. 12 shows another example of the path end point connection data generating part 704.

Addition of an equipment nozzle point database 1201 for inputting data to the line segment end point detecting part 1101 provides end point connection data between the equipment nozzle point and the physical path data in addition to between two records of the physical path data. The equipment nozzle point database 1201 reads out a nozzle point coordinate values and a nozzle from an equipment arrangement drawing or coordinate values of a nozzle point on the equipment and the nozzle number from 3D model data of a plant equipment with a nozzle point. In addition assigning the nozzle point number to the ID and nozzle point coordinates to the way point string provides nozzle point data with a data format identical with the physical path data. This permits no modification of the input data processing inside the line segment end point detecting part 1101.

Figure 13:
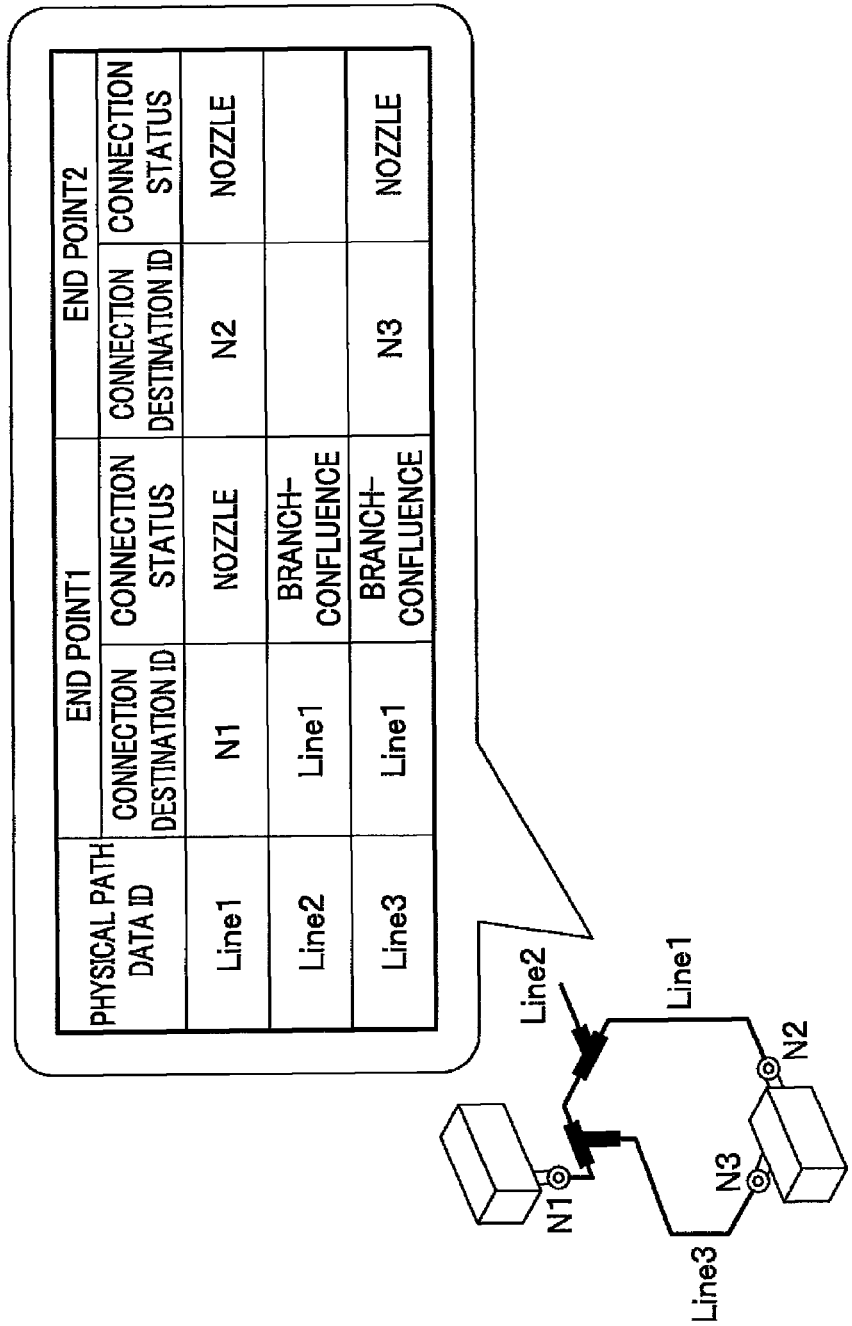
FIG. 13 is an illustration of an example of an end point connection table generated with physical path data and equipment nozzle point data.

FIG. 13 shows an example of an end point connection table generated with the physical path data and the equipment nozzle point data.

Next a configuration of the correspondence table updating processing part 706 will be described.

Figure 14:
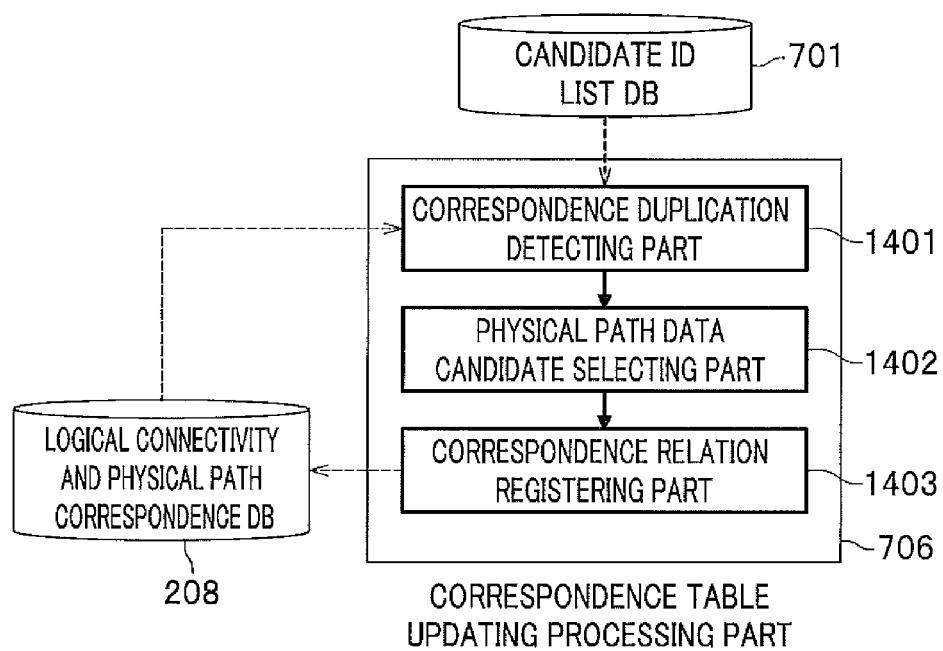
FIG. 14 is a block diagram of a correspondence table renewing part according to the embodiment of the present invention.

FIG. 14 shows a block diagram of the correspondence table updating processing part 706. The correspondence table updating processing part 706 registers the logical connectivity data ID and corresponding physical path data ID thereof in the logical connection and physical path correspondence table. In addition the correspondence table updating processing part 706 prevents a plurality of records of the physical path data from being linked to one record of the logical connectivity data and a plurality of records of logical connectivity data from being linked to one record of the physical path data. The correspondence table updating processing part 706 includes a correspondence duplication detecting part 1401, a physical path data candidate selecting part 1402, and a correspondence relation registering part 1403.

The correspondence duplication detecting part 1401 detects a record of physical path data that has been linked to the logical connectivity data. The physical path data candidate selecting part 1402 selects one of candidates of the physical path data when there are a plurality of candidates of the physical path data. In addition, the correspondence relation registering part 1403 registers a correspondence relation between the physical path data selected by the user and the logical connectivity data in the logical connection and physical path correspondence table.

A processing method in the correspondence table updating processing part 706 will be described.

The correspondence duplication detecting part 1401 searches the logical connection and physical path correspondence table with the one record of the physical path data ID obtained from the candidate ID list database 701 as query for the logical connectivity data ID that has been linked to the physical path data ID as the query (Step 1).

The physical path data candidate selecting part 1402 displays the logical connectivity data ID on the candidate ID list and a physical path data candidate ID group on the output device 111 of the interactive processing part 109. During this, when the logical connectivity data ID that has been linked in Step 1 is detected, the physical path data candidate selecting part 1402 further displays the detected logical connectivity data ID that has been linked (Step 2).

The correspondence relation registering part 1403 receives the user selection command inputted with the input device 110 and registers the selected physical path data ID and the logical connectivity data ID in the logical connection and physical path correspondence table (Step 3).

Figure 15:
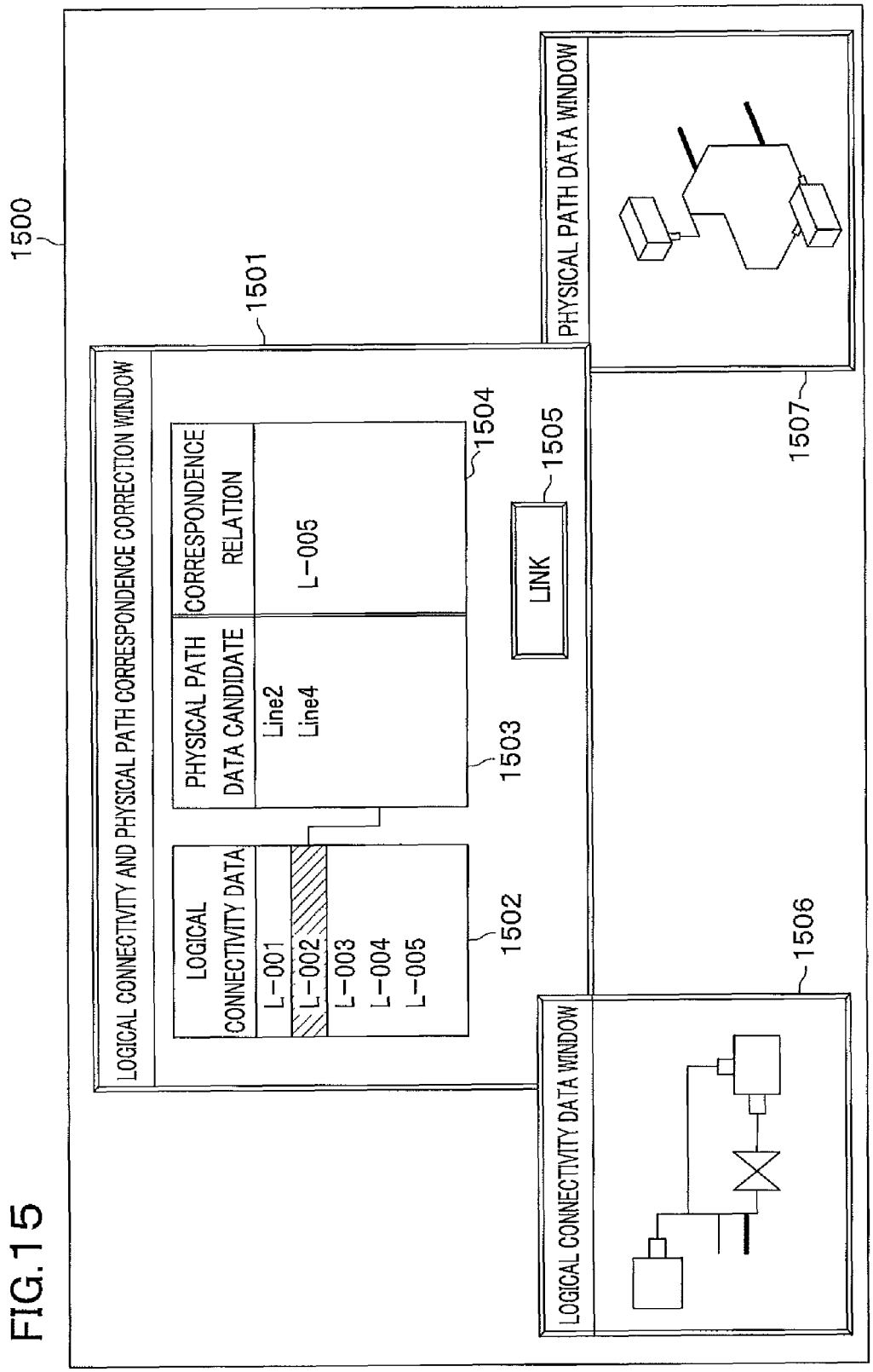
FIG. 15 is an illustration of a screen image example for physical path data candidate selection.

An example of displayed image by the physical path data candidate selecting part 1402 will be described. FIG. 15 shows an example of screen image 1500 for selecting candidates of the physical path data.

The screen image 1500 has a logical connection and physical path correspondence correction window 1501, a logical connectivity data window 1506, and a physical path data window 1507. The logical connection and physical path correspondence correction window 1501 includes a logical connectivity data region 1502, physical path data candidate region 1503, a correspondence relation region 1504, and a linking button 1505.

The logical connectivity data window 1506 visually shows the logical connectivity data selected by the user and the logical connectivity data displayed on the correspondence relation display region 1504 on a pipe system drawing. The physical path data window 1507 visually shows a part corresponding to the physical path data ID selected on the physical path data candidate selecting region 1503 on the physical path data.

When a plurality of physical path data candidates are in the logical connectivity data, one of records of the logical connectivity data is highlighted on the logical connectivity data window 1506. On the other hand, a plurality of records of the physical path data are highlighted on the physical path data window 1507. In addition, when the physical path data selected on the physical path data candidate selecting region 1503 has had correspondence relation, on the physical path data window 1507, one record of the physical path data is highlighted and on the logical connectivity data window 1506 a plurality of records of the logical connectivity data are highlighted.

Figure 16:
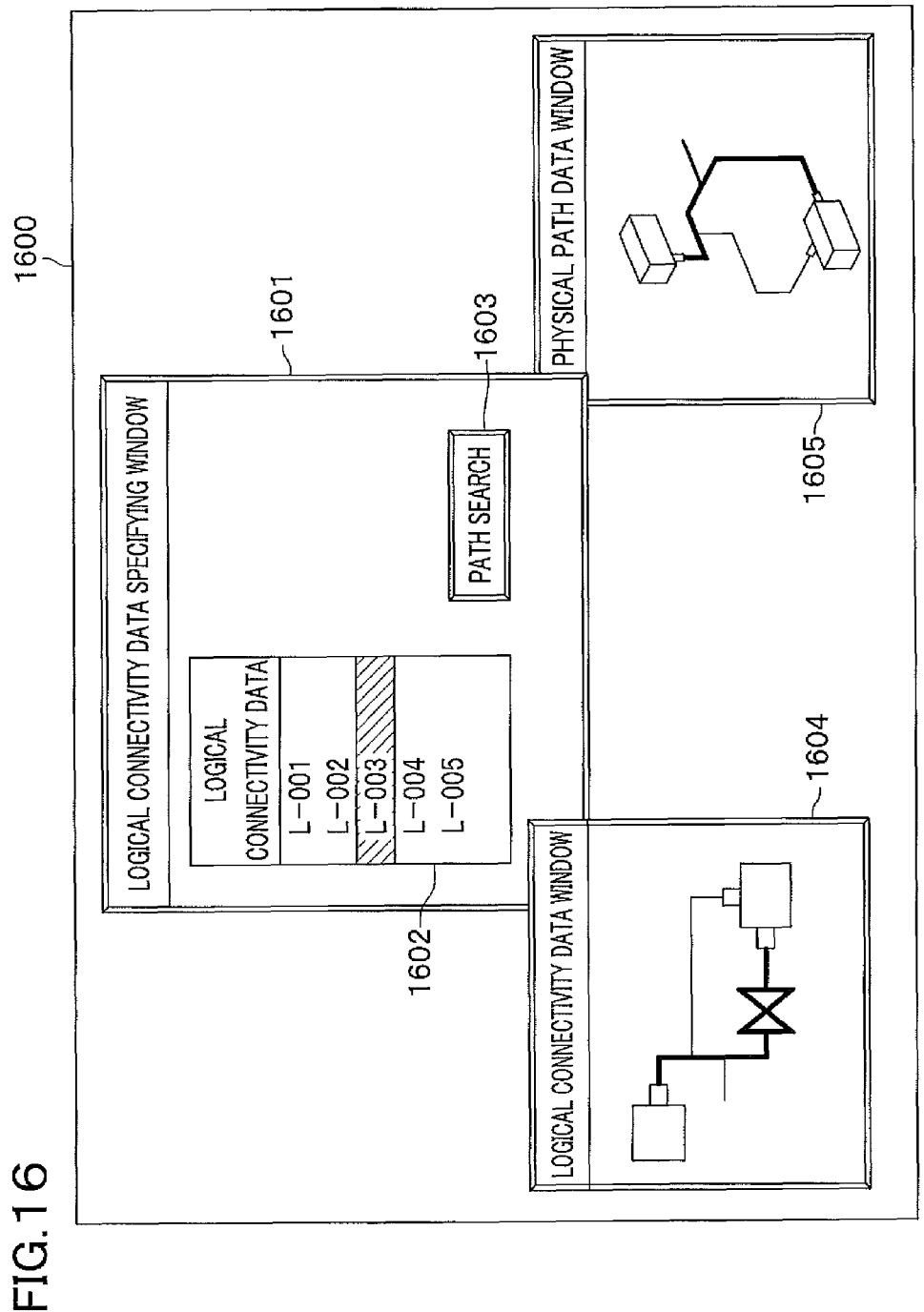
FIG. 16 is an illustration of a screen image example for a user operation screen image in the logical connectivity data specifying part.
Figure 17:
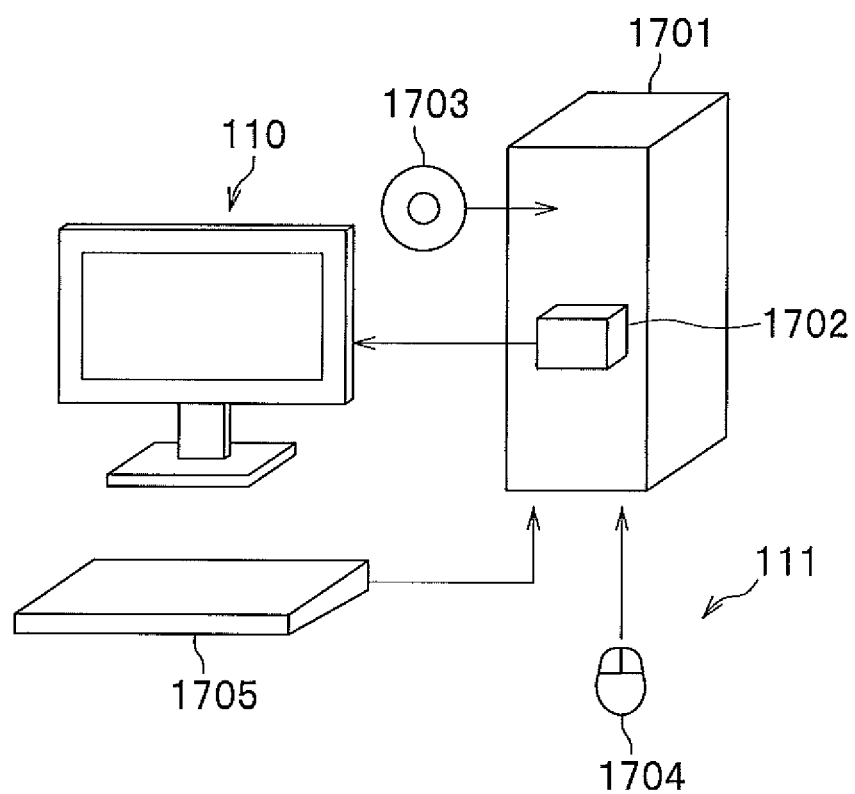
FIG. 17 is an illustration of a computer on which layout-design support program stored in a computer readable medium is loaded for causing the computer to perform designated tasks according to the embodiment of the present invention.

FIG. 16 shows an example of a user operation screen image 1600 in the logical connectivity data specifying part 204. A user operation screen image 1600 includes a logical connectivity data specifying window 1601, a logical connectivity data window 1604, and a physical path data window 1605.

The logical connectivity data specifying window 1601 is a GUI (Graphical User Interface) for linking the logical connectivity data specified by the user to the physical path data and always displayed on the user operation screen image 1600. On the other hand, the logical connectivity data window 1604 and the physical path data window 1605 are viewers providing visual image showing correspondence relation, and both or one of the logical connectivity data window 1604 and the physical path data window 1605 may not be displayed.

The logical connectivity data specifying window 1601 includes a logical connectivity data display region 1602 for displaying a list of all logical connectivity data IDs held in the logical connectivity database 104 and a path search button 1603.

First, the user selects a given number of records of logical connectivity data to be linked using the logical connectivity data display region 1602. After selection, when the user operates the path search button 1603, a process for linking the logical connectivity data to the physical path data by the layout-design support system 1 is started.

The logical connectivity data window 1604 provides a visual image, in a pipe system drawing, of the logical connectivity selected by the user on the logical connectivity data display region 1602. On the other hand, the physical path data window 1605 provides a visual image, n a three-dimensional space, of the physical path data corresponding to the logical connectivity data selected by the user.

As mentioned above, according to the embodiment, a three-dimensional model by automatically linking the physical path data to the logical conductivity data can be provided.

Accordingly, the pipe path design process in 3D-space can be done prior or at the same time as the pipe system design process. In addition, because the pipe system data and the pipe path data that have been prepared in design process can be automatically linked to each other, the pipe designing can be completed in a short period.

The invention claimed is:

1. A layout-design support system comprising:
a computer device including a processor, a memory coupled to the processor, and a program stored in the memory, wherein the processor is configured to execute the program and the program includes:
a logical designing part including a logical connectivity data storage that stores logical connectivity data indicating a logical connectivity between pipe component groups and equipment groups and including logical end point connection data;
a geometry data designing part comprising:
a physical path data storage that stores physical path data that is pipe path data in a three-dimensional space and includes path end point data;
a pipe components model data storage that stores pipe components model data that is geometry data of the pipe components in the three-dimensional space; and
a pipe component model generating part that generates the pipe components model data; and
a data linking part comprising:
an interactive processing part that performs an interactive processing with a user;
a logical connectivity data specifying part that detects the logical connectivity data specified by the user from the logical connectivity data storage on the basis of a user command inputted into the interactive processing part;
a physical path data searching part that searches the physical path data storage for the physical path data including the path end point data that matches the logical end point data included in the logical connectivity data detected by the logical connectivity data specifying part and generates a logical connection and physical path data correspondence table including correspondence data that links the logical connectivity data with the physical path data of which logical end point data and path end data match each other;
a logical connection and physical path correspondence table storage that stores the logical connection and physical path data correspondence table generated by the physical path data searching part;
a pipe attribute data generating part that generates pipe attribute data using the logical connection and physical path data correspondence table; and
a pipe attribute data storage that stores pipe attribute data generated by the pipe attribute data generating part and sends the stored pipe attribute data to the pipe component model generating part;
wherein the physical path data searching part comprises:
a logical end point connection data extracting part that extracts from the logical connectivity data storage the logical end point data of the logical connectivity data detected by the logical connectivity data specifying part;
a path end point connection data generating part that obtains the physical path data from the physical path data storage and generates path end point connection data that is end point data of the physical path data;
a path end point connection data storage that stores the path end point connection data generated by the path end point connection data generating part;
a matched end point detecting part that compares the logical end point connection data obtained by the logical end point data extracting part with the path end point connection data stored in the path end point connection data storage, detects the physical path data of which path end point connection data matches the logical end point connection data obtained by the logical end point data extracting part, and registers a physical path data ID of the detected physical path data in a candidate ID list as candidate for correspondence to the logical connectivity data detected by the logical connectivity data specifying part; and
a correspondence table updating part that stores correspondence relation between the logical connectivity data and the physical path data on the basis of the candidate ID list in the logical connection and physical path correspondence table.

2. The layout-design support system as claimed in claim 1, wherein the physical path end point connection data generating part performs an interference determination between a path line segment included in the physical path data and an end point of another line segment to estimate a connection relation among the line segments in the physical path data.

3. The layout-design support system as claimed in claim 1, wherein the physical path end point connection data generating part comprises:

a line segment end point connection data detecting part that detects a first record of the physical path data of which line segments connect to an end point of a second record of the physical path data to be a target from Euclid distance between coordinates of the end point of the second record and the line segments to which the end point connects;

a line segment connection data storage that stores the first record of the physical path data detected by the line segment end point connection data detecting part;

an end point connection status detecting part that compares the physical path end point connection data of records of the physical path data each other to detect whether the connection status of each of the records of the physical path data is either of branch-confluence, a butt joint, or an open end.

4. The layout-design support system as claimed in claim 2, wherein the physical path end connection data generating part detects coordinate matching between the physical path data and a nozzle of the equipment on the basis of geometry data of a nozzle point of the equipment connected to the pipe component.

5. The layout-design support system as claimed in claim 1, wherein the correspondence table updating part comprises:
   a correspondence duplication detecting part that detects the physical path data that has been linked to the logical connectivity data;
   a physical path data candidate selecting part that selects one of records of the physical path data on the basis of a user command inputted with the interactive processing part when there are a plurality of candidate records of the physical path data corresponding to the logical connectivity data; and
   a correspondence registering part that registers the correspondence relation between a record of the physical path data selected by the physical path data candidate selecting part and a record of the logical connectivity data in the logical connection and geometry corresponding table.

6. The layout-design support system as claimed in claim 1, wherein the logical connectivity data specifying part displays the logical connectivity data in a list format on a screen of an output device and detects the logical connectivity data on the basis of a user command inputted in an input device of the interactive processing part.

7. The layout-design support system as claimed in claim 1, wherein the correspondence table updating processing part displays on a screen of the output device of the interactive processing part in a list format correspondence data between the physical path data and the logical connectivity data registered in the candidate ID list, and one record of the physical path data is selected from records of the physical path data on the list on the basis of a user command inputted by the input device of the interactive process part.

8. A layout-design support program on a non-transitory computer readable medium for causing a computer to perform designated tasks comprising:
   a logical designing part including a logical connectivity data storage that stores logical connectivity data indicating a logical connectivity between pipe component groups and equipment groups and including logical end point connection data;
   a geometry data designing part comprising:
      a physical path data storage that stores physical path data that is pipe path data in a three-dimensional space and includes path end point data;
      a pipe components model data storage that stores pipe components model data that is geometry data of the pipe components in the three-dimensional space; and
      a pipe component model generating part that generates the pipe components model data; and
   a data linking part comprising:
      an interactive processing part that performs an interactive processing with a user;
      a logical connectivity data specifying part that detects the logical connectivity data specified by the user from the logical connectivity data storage on the basis of a user command inputted into the interactive processing part;
      a physical path data searching part that searches the physical path data storage for the physical path data including the path end point data that matches the logical end point data included in the logical connectivity data detected by the logical connectivity data specifying part and generates a logical connection and physical path data correspondence table including correspondence data that links the logical connectivity data with the physical path data of which logical end point data and path end data match each other;
      a logical connection and physical path correspondence table storage that stores a logical connection and physical correspondence table generated by the physical path data searching part;
      a pipe attribute data generating part that generates pipe attribute data using the logical connection and physical path correspondence table; and
      a pipe attribute data storage that stores pipe attribute data generated by the pipe attribute data generating part and sends the stored pipe attribute data to the pipe component model generating part;
   wherein the physical path data searching part comprises:
      a logical end point connection data extracting part that extracts from the logical connectivity data storage the logical end point data of the logical connectivity data searched by the logical connectivity data specifying part;
      a path end point connection data generating part that obtains the physical path data from the physical path data storage and generates path end point connection data that is end point data of the physical path data;
      a path end point connection data storage that stores the path end point connection data generated by the path end point connection data generating part;
      a matched end point detecting part that compares the logical end point connection data obtained by the logical end point data extracting part with the path end point connection data stored in the end point connection data storage, detects the physical path data of which first and second end point connection data match each other, and registers a physical path data ID of the detected physical path data in a candidate ID list as candidate for correspondence to the logical connectivity data detected by the logical connectivity data specifying part; and
      a correspondence table updating part that stores correspondence relation between the logical connectivity data and the physical path data on the basis of the candidate ID list in the logical connection and physical path correspondence table.

9. The layout-design support program as claimed in claim 8, wherein the physical path end point connection data generating part performs an interference determination between a path line segment included in the physical path data and an end point of another line segment to estimate a connection relation among the line segments in the physical path data.

10. The layout-design support program as claimed in claim 8, wherein the physical path end point connection data generating part comprises:
   a line segment end point connection data detecting part that detects a first record of the physical path data of which line segments connect to an end point of a second record of the physical path data to be a target from Euclid distance between coordinates of the end point of the second record and the line segments to which the end point connects;
   a line segment connection data storage that stores the first record of the physical path data detected by the line segment end point connection data detecting part;
   an end point connection status detecting part that compares the physical path end point connection data of records of the physical path data each other to detect whether the connection status of the records of the physical path data is either of branch-confluence, a butt joint, or an open end.

11. The layout-design support program as claimed in claim 9, wherein the physical path end connection data generating part detects coordinate matching between the physical path data and a nozzle of the equipment on the basis of geometry data of a nozzle point of the equipment connected to the pipe component.

12. The layout-design support program as claimed in claim 8, wherein the correspondence table updating part comprises:
   a correspondence duplication detecting part that detects the physical path data that has been linked to the logical connectivity data;
   a physical path data candidate selecting part that selects one of records of the physical path data on the basis of a user command inputted with the interactive process part when there are a plurality of candidate records of the physical path data corresponding to the logical connectivity data; and
   a correspondence registering part that registers the correspondence relation between a record of the physical path data selected by the physical path data candidate selecting part and a record of the logical connectivity data in the logical connection and geometry corresponding table.

13. The layout-design support program as claimed in claim 8, wherein the logical connectivity data specifying part displays the logical connectivity data in a list format on a screen of an output device and detects the logical connectivity data on the basis of a user command inputted in an input device of the interactive processing part.

14. The layout-design support program as claimed in claim 8, wherein the correspondence table updating processing part displays on a screen of the output device of the interactive processing part in a list format correspondence data between the physical path data and the logical connectivity data registered in the candidate ID list, and one record of the physical path data is selected from records of the physical path data on the list on the basis of a user command inputted by the input device of the interactive process part.

* * * * *